(No Model.)

E. WEBB.
PRESSURE REGULATOR.

No. 504,507. Patented Sept. 5, 1893.

WITNESSES:
Walter S. Hill
Edward Nyman

INVENTOR:
Edward Webb
per Edw. Dummer, Atty.

UNITED STATES PATENT OFFICE.

EDWARD WEBB, OF READING, MASSACHUSETTS.

PRESSURE-REGULATOR.

SPECIFICATION forming part of Letters Patent No. 504,507, dated September 5, 1893.

Application filed November 21, 1892. Serial No. 452,741. (No model.)

*To all whom it may concern:*

Be it known that I, EDWARD WEBB, a subject of the Queen of Great Britain, and a resident of Reading, in the county of Middlesex and State of Massachusetts, have invented a new and useful Improvement in Pressure-Regulators, of which the following is a specification, reference being had to the accompanying drawings.

The object of my invention is to provide a device, for the reduction, and hence regulation, of the pressure of gases or liquids, particularly of steam, for the various purposes for which such reduction and regulation are required, the invention relating particularly to the means for moving and regulating the motion of the piston or valve of the regulator, and to the combination of passages with said piston or valve and the cylinder or chest therefor, by which are obtained several places of throttling or reduction, and a device comparatively noiseless in operation.

Figure 3:
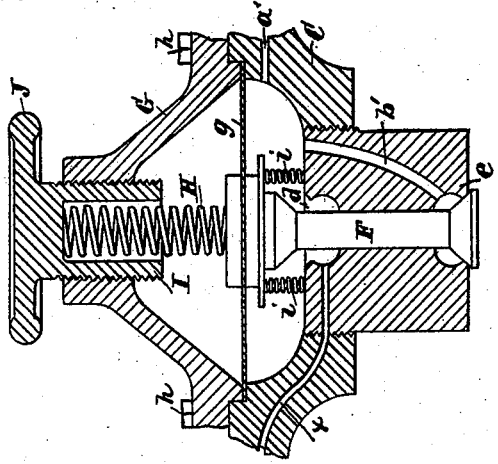
Figure 2:
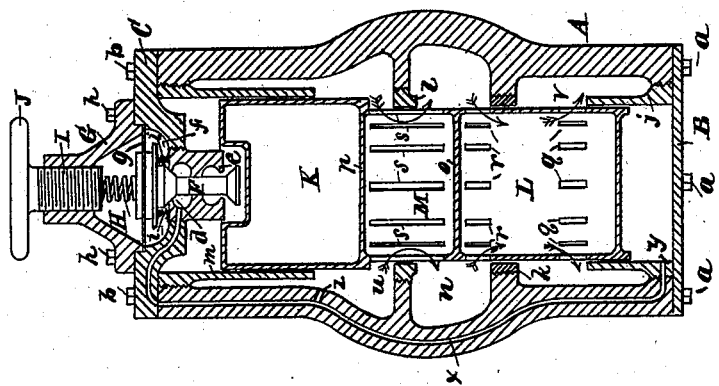
Figure 1:
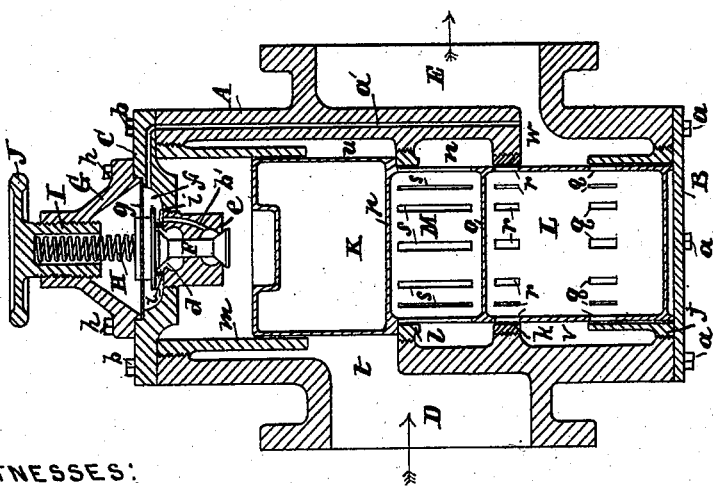

In the drawings Figure 1 is a vertical section of a pressure regulator embodying my invention the piston and valves being in their normal positions before the inlet of steam. Fig. 2 is a vertical section of the same device, at right angles to the section of Fig. 1, the piston being raised, as by the action of steam. Fig. 3 is a section showing certain details drawn on a larger scale than in the other figures.

The cylinder or chest A is closed at the bottom by means of a plate B held in place by screws $a$, and has at the top an end-piece C secured thereto by screws $b$. This cylinder or chest has an extension D at about midway thereof providing an inlet, and another extension E for an outlet. The end-piece C is formed to provide for a valve F which slides therein, and an upper seat $d$ and a lower seat $e$ for the valve. There is also in said end-piece a chamber $f$, which is covered by a diaphragm $g$ held in place by a cap G and screws $h$. Under this diaphragm are springs I acting to press the valve upward, and above the diaphragm a central spring H to press the same and diaphragm downward. The tension of the latter spring may be regulated by means of a screw I to screw in the cap G, and a hand-wheel J secured to the screw.

The cylinder or chest A is provided with a lining or internal rings $j, k, l,$ and $m$, in which slides a piston K to make a close running fit with the rings $j, k$ and $l$, a joint allowing the passage of steam with the ring $m$. In the walls of the cylinder or chest A is an annular chamber, $n$. The piston K is hollow, being closed at each end, and has two horizontal partitions $o$ and $p$ therein, by which there are formed two chambers L, and M in the piston. There are several openings in the wall of each of these chambers, of suitable relative size and the required shape, substantially as shown, two sets of openings leading from the chamber L. When the piston is at the extreme of its travel downward the upper edge of the openings $q$ from the chamber L are on a level with the upper edge of the ring $j$, the upper edge of the openings $r$ from the chamber L on a level with the upper edge of the ring $k$, and the upper edge of the openings $s$ from the chamber M on a level with the upper edge of the ring $l$. The inlet $t$ opens into an annular space $u$ in the cylinder A just above the ring $l$. The outlet $w$ extends likewise from an annular space $v$ just below the ring $k$. A passage $x$ for steam extends in the wall of the cylinder and end-piece C to the upper seat $d$ to be opened or closed by means of the valve F, and extends to the bottom of the cylinder entering therein at $y$. A passage $z$ leads from the inlet $t$ to the passage $x$. A passage $a'$ extends into the wall of the cylinder and end-piece C from the outlet $w$ to the chamber $f$, and from this chamber a passage $b'$ leads to the seat $e$ to be opened or closed by the valve F.

In operation steam, entering the inlet $t$ at a pressure to be reduced, will pass through the passages $z$ and $x$ to the bottom of the cylinder, and, owing to the loose fit of the piston and ring $m$, will pass to the upper part of the cylinder. The valve F will be pressed upward, and the piston will remain down until by means of the hand-wheel and screw I the spring H be sufficiently compressed to force the valve F downward against the pressure of the steam. Owing to the latter movement the upper end of the passage $x$ will be closed and the corresponding end of the passage $b'$ opened. Since then there is a free outlet for the steam above the piston K through the passages $b'$ and $a'$, and the pressure below the piston continues, the piston will be forced upward so that steam will pass from the inlet $t$ through the openings $s$ into the chamber M, again through these openings $s$ into the chamber $n$, from this latter chamber through the openings $r$ into the chamber L, and from this chamber through the openings $q$ into the annular space $v$ and outlet $w$. When the piston has been raised sufficiently to allow enough steam to pass through the openings therein above the corresponding rings to cause the pressure in the outlet and hence in the chamber $f$ great enough to move the valve F upward against the action of the spring H, the passage $b'$ will be closed at the seat $e$. Thereupon the pressure of steam will increase above the piston, and, since the steam below the piston will escape through the passage $x$ to the chamber $f$ and thence through the passage $a'$ to the outlet, the piston will be forced downward, thus preventing the movement of steam through the openings in the piston and thus to the outlet. The pressure of steam will thus be reduced in the outlet and hence in the chamber $f$ and the valve F will fall allowing steam to escape from the cylinder above the piston through the passages $b'$ and $a'$ and therefore the piston will again be raised for the passage of steam through the openings thereof. Thus the action will continue and, as will be readily understood, the degree of pressure of the steam in the outlet will be in proportion to the force of the spring H, and the pressure may be regulated by means of this spring and the screw and hand-wheel therefor. I find it more desirable to move the piston (which together with the openings therein and the ring operates as a valve, or forms several valves which act simultaneously) both ways by steam. It should be noted particularly that there are several places of reduction of pressure, each of these places being where the steam passes through a set of openings in the piston over the corresponding ring, or at each valve of the piston and seat therefor. Owing to these several reductions, occurring successively, when the resulting reduction is to be large it can be very effectively obtained and comparatively without noise.

As will evidently appear, the number of chambers in the piston provided with openings in the walls, and corresponding chambers or spaces in the wall of the cylinder or, in other words, the piston-valves and seats therefor may be of any desired number to obtain as many places of reduction as may be deemed best for any initial and required final pressure without departing from the essential features of my invention.

I claim as my invention—

1. In a pressure-regulator the combination of a cylinder having an inlet and an outlet, passages leading from said inlet and outlet to each end of the cylinder, two chambers in the wall of the cylinder one opening into said inlet and the other into said outlet, an intermediate chamber in the wall of said cylinder, a piston-valve to move in said cylinder provided with two chambers, and openings in the wall of each of the piston-chambers, all of said openings and said chambers being so located with reference to each other that passages formed thereby, extending from said inlet and a chamber in the cylinder to a chamber in the piston and thence to said intermediate chamber and thence to the other chamber in the piston and thence to the chamber in the cylinder opening into the outlet, will be opened or closed simultaneously on movement of the piston, substantially as and for the purpose set forth.

2. In a pressure-regulator the combination of a main casing having an inlet and outlet, a casing located at one end of the main casing, forming therewith an auxiliary chamber, said main casing being constructed with passages in the wall thereof, one leading from the inlet passage to said auxiliary chamber and also to the opposite end of the casing, and the other leading from said auxiliary chamber to the outlet passage, a diaphragm in said auxiliary chamber, a valve controlled by a spring located in the end of the casing, controlling a passage between said auxiliary chamber and the interior of the pressure-regulator, a cylinder provided with an inlet and outlet and several chambers or annular spaces located centrally within the regulator, and the piston provided with chambers and having openings in the walls thereof, working in said cylinder, substantially as and for the purpose set forth.

EDWARD WEBB.

Witnesses:
WALTER S. HILL,
EDWARD DUMMER.